United States Patent

Hyoung

(10) Patent No.: US 9,948,404 B2
(45) Date of Patent: Apr. 17, 2018

(54) CHANNEL ADAPTIVE HUMAN BODY COMMUNICATION SYSTEM

(71) Applicant: Electronics and Telecommunications Research Institute, Daejeon (KR)

(72) Inventor: Chang Hee Hyoung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/402,039

(22) Filed: Jan. 9, 2017

(65) Prior Publication Data

US 2017/0207861 A1   Jul. 20, 2017

(30) Foreign Application Priority Data

Jan. 19, 2016   (KR) .................. 10-2016-0006602

(51) Int. Cl.
| | | |
|---|---|---|
| H04B 5/00 | (2006.01) | |
| H04B 7/00 | (2006.01) | |
| H04B 13/00 | (2006.01) | |
| H04W 4/00 | (2018.01) | |

(52) U.S. Cl.
CPC .......... H04B 13/005 (2013.01); H04W 4/008 (2013.01)

(58) Field of Classification Search
CPC .................................... H04B 13/005
USPC ............................... 455/41.1–41.3
See application file for complete search history.

(56) References Cited

U.S. PATENT DOCUMENTS

| | | | | |
|---|---|---|---|---|
| 2004/0092296 A1* | 5/2004 | Minotani | ............ | H04B 1/3827 455/575.6 |
| 2006/0052056 A1 | 3/2006 | Park et al. | | |
| 2006/0052074 A1* | 3/2006 | Minotani | ............ | H04B 13/005 455/276.1 |
| 2007/0211828 A1* | 9/2007 | Song | ............ | H03K 5/003 375/316 |
| 2010/0298669 A1* | 11/2010 | Ida | ............ | A61B 5/0002 600/302 |
| 2011/0201276 A1* | 8/2011 | Forsell | ............ | A61B 5/0028 455/41.2 |

(Continued)

FOREIGN PATENT DOCUMENTS

| | | |
|---|---|---|
| KR | 10-2006-0022739 A | 3/2006 |
| KR | 10-2012-0032391 A | 4/2012 |
| KR | 10-2013-0031983 A | 4/2013 |

OTHER PUBLICATIONS

Mirhojjat Seyedi et al., "A Survey on Intrabody Communications for Body Area Network Applications", IEEE Transactions on Biomedical Engineering, Aug. 2013, pp. 2067-2079, vol. 60, No. 8, IEEE.

(Continued)

*Primary Examiner* — Simon Nguyen

(57) ABSTRACT

Provided is a human body communication system including a master device configured to output a first signal based on a first data signal and a signal having a pattern in which a waveform of a first carrier wave and a waveform of a second carrier wave are repeated; and a slave device configured to receive the first signal to determine a carrier wave having a low level of attenuation among the first carrier wave and the second carrier wave, and output a second signal based on the determined carrier wave and a second data signal.

19 Claims, 15 Drawing Sheets

(56) References Cited

U.S. PATENT DOCUMENTS

| | | | |
|---|---|---|---|
| 2012/0263218 A1* | 10/2012 | Dal Molin | A61N 1/37288 375/224 |
| 2013/0149961 A1* | 6/2013 | Mori | H04B 13/005 455/41.1 |
| 2013/0177098 A1 | 7/2013 | Jung et al. | |
| 2014/0080430 A1* | 3/2014 | Lee | H04B 13/005 455/91 |
| 2014/0184555 A1* | 7/2014 | Pi | G08C 17/06 345/174 |
| 2015/0149310 A1* | 5/2015 | He | G06Q 20/322 705/21 |
| 2016/0192112 A1* | 6/2016 | Sydir | H04W 4/006 340/686.6 |
| 2016/0226627 A1* | 8/2016 | Nabetani | H04L 1/16 |
| 2017/0117972 A1* | 4/2017 | Ishibashi | H04B 5/0031 |

OTHER PUBLICATIONS

Maria Amparo Callejon et al., "A Comprehensive Study into Intrabody Communications Measurements", IEEE Transactions on Instrumentation and Measurement, Sep. 2013, pp. 2446-2455, vol. 62, No. 9, IEEE.

* cited by examiner

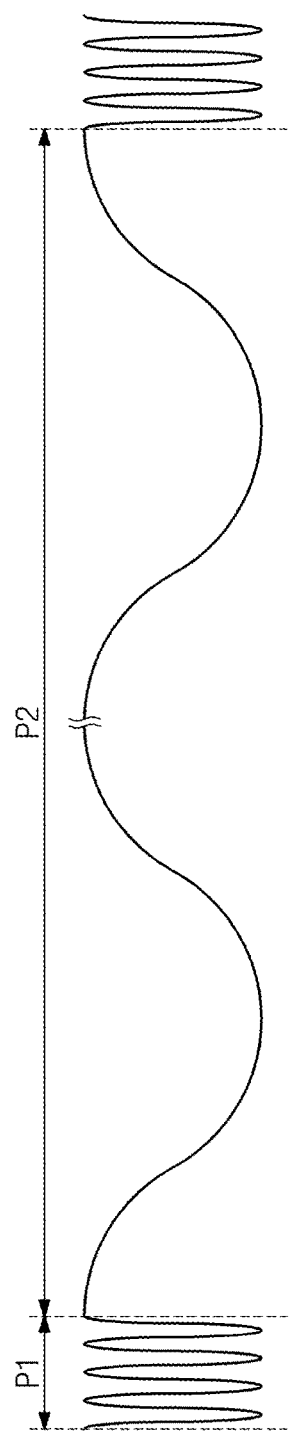
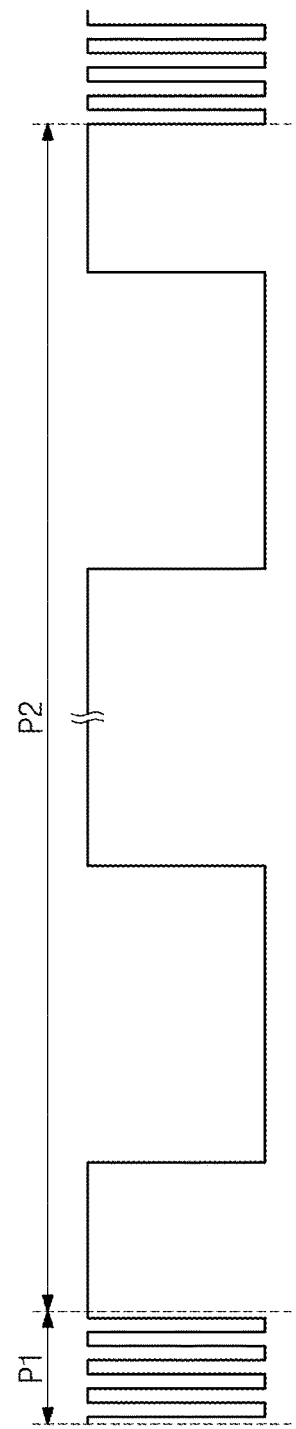

CHANNEL ADAPTIVE HUMAN BODY COMMUNICATION SYSTEM

CROSS-REFERENCE TO RELATED APPLICATIONS

This U.S. non-provisional patent application claims priority under 35 U.S.C. § 119 of Korean Patent Application No. 10-2016-0006602, filed on Jan. 19, 2016, the entire contents of which are hereby incorporated by reference.

BACKGROUND

The present disclosure herein relates to a communication system, and more particularly, to a human body communication system that uses a human body as a channel.

Human body communication uses a human body having conductivity as a channel. Data is transmitted by using a transmitter that is connected to a portion of the human body. The transmitted data is recovered by using a receiver that is connected to another portion of the human body or outside the human body. When using the human body communication, the communication between portable devices or the communication between a fixed device and a user may be performed through a user touch. For example, the communication between a portable digital assistant (PDA), a portable computer, a digital camera, an MP3 player, and a mobile phone may be performed through a user touch. Payment for the usage of a printer, a credit card, a TV, an entrance system or transportation may be performed through a user touch.

While the air transmits a radio wave uniformly, the delivery characteristic of electricity or the radio wave through the human body is determined according to the electrical characteristics of tissues that form the human body, i.e., permittivity and conductivity. Thus, the receiver that is at any portion on the human body is difficult to receive an accurate radio wave from a transmitter. The radio wave delivered through the human body loses more energy than the radio wave that is delivered through the air. Since the human body has conductivity, the human body is easy to receive an interference signal from the surrounding environment.

SUMMARY

The present disclosure relates to determining the characteristic of a communication channel from signals that a human body communication system receives, transmitting and receiving information by using a carrier wave that has a frequency at which there is little signal distortion or attenuation when passing a channel, based on the determined characteristic.

That is, the present disclosure provides a human body communication system that has reliability and accuracy.

An embodiment of the inventive concept provides a human body communication system including a master device and a slave device. The master device outputs a first signal based on a first data signal and a signal having a pattern in which a waveform of a first carrier wave and a waveform of a second carrier wave are repeated. The slave device receives the first signal to determine a carrier wave having a low level of attenuation among the first carrier wave and the second carrier wave, and outputs a second signal based on the determined carrier wave and a second data signal.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIGS. 9 and 10 relate to the waveform of the output signal of a transmission module according to an embodiment of the inventive concept;

DETAILED DESCRIPTION

In the following, particular embodiments of the inventive concept are described with reference to the accompanying drawings in order to describe the inventive concept in detail so that a person skilled in the art to which the inventive concept pertains may easily practice the technical spirit of the inventive concept.

A human body communication technology in which a portion of a human body applies an electrical signal by using the human body as a medium and another portion of the human body receives the signal has many transmission modes. Representative examples include a capacitive coupling mode and a galvanic coupling mode.

In general, the capacitive coupling mode uses a higher frequency band than the frequency of the galvanic coupling mode. For example, it is assumed that a communication system that uses the frequency of the capacitive coupling mode and a communication system that uses the frequency of the galvanic coupling mode have the same occupation time on a channel. In this case, since the capacitive coupling mode uses a high frequency, high speed data transmission is possible during the same occupation time. On the contrary, since the galvanic coupling mode uses a low frequency, slow speed data transmission is possible during the same occupation time.

Figure 1:
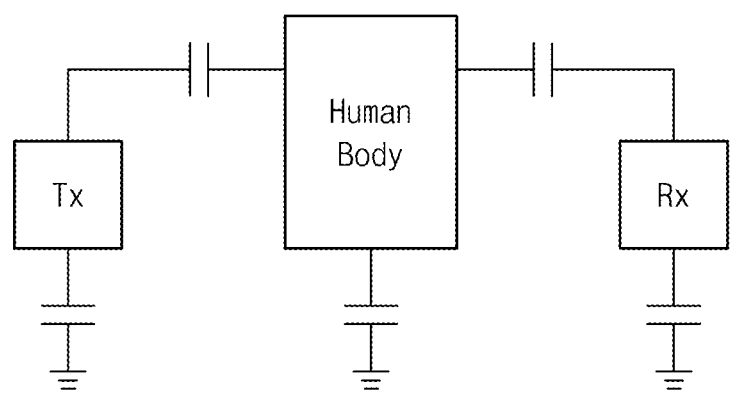
FIG. 1 relates to a capacitive coupling mode among communication modes according to an embodiment of the inventive concept.

FIG. 1 relates to a capacitive coupling mode among communication modes according to an embodiment of the inventive concept. Referring to FIG. 1, there is an advantage in that the quality of a received signal according to the capacitive coupling mode is not proportional to the transmission distance of a signal. However, there is a drawback in that the quality of the received signal according to the capacitive coupling mode is significantly affected by surrounding ground, especially, the gap between a transmission signal electrode and a ground electrode. For example, the quality of the received signal varies if there is a material having permittivity different from the air, a human being, or a chair or table that is made of tree between a transmitter TX or a receiver RX and a coupled reference ground GND.

Referring to FIG. 1, one end of the transmitter Tx is in contact with a human body and applies a signal and the other end thereof is coupled to the reference ground GND. In addition, one end of the receiver RX is in contact with the human body and receives a signal, and the other end thereof is coupled to the reference ground GND. Also, the human body in the inventive concept corresponds to a communication channel through which a signal passes.

The capacitor between two terminals in FIG. 1 means coupling between the two terminals. In addition, it is reported that the capacitive coupling mode is optimized when using a high frequency band of about 60 Mhz to about 70 Mhz, but a band may vary according to the physical size of the human body, such as stature (height), and above all, the surrounding ground environment. Also, since a signal delivery characteristic is excellent at a part of the human body, such as hand or foot, it may be mostly used for communication with an external device.

Figure 2:
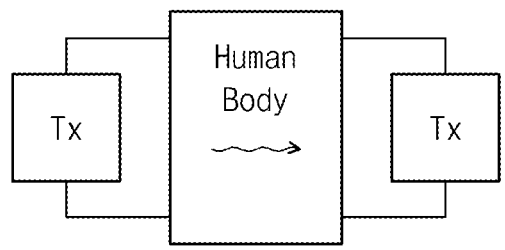
FIG. 2 relates to a galvanic coupling mode among communication modes according to an embodiment of the inventive concept.

FIG. 2 is a diagram relating to a galvanic coupling mode among communication modes according to an embodiment of the inventive concept. Referring to FIG. 2, there is an advantage in that the quality of a received signal according to the galvanic coupling mode has a little impact according to the motion of the human body. However, since the galvanic coupling mode uses a conduction current, there is a drawback in that the quality of the received signal decreases with an increase in transmission distance of a signal that passes through a channel.

Referring to FIG. 2, both ends of the transmitter TX are in contact with the human body. A conduction current is generated due to a difference in voltage of both ends of the transmitter TX and a signal is delivered by the generated conduction current.

The galvanic coupling mode may be optimized when using a signal band of about 20 kHz to about 60 kHz, a lower frequency than the capacitive coupling mode. Also, since a signal delivery characteristic around the trunk is excellent, it may be used for devices, such as a cardiac pacemaker and a capsule endoscope.

Figure 3:
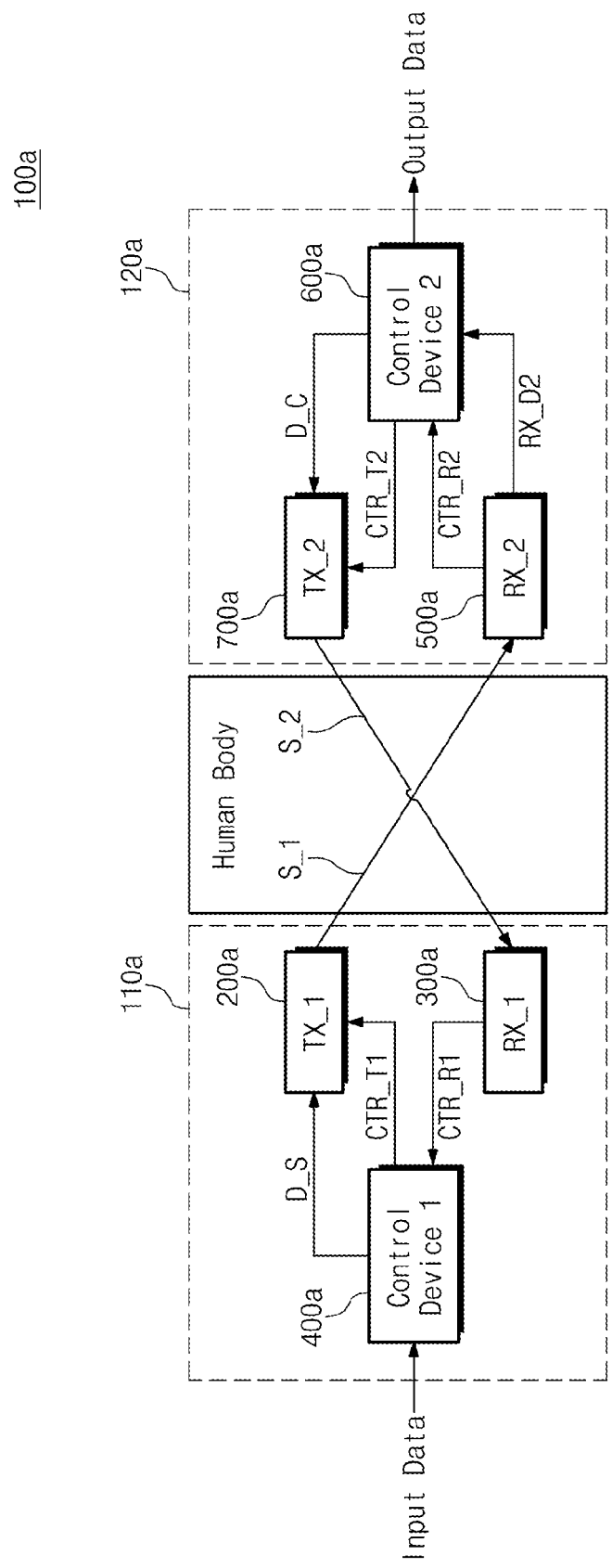
FIG. 3 is a block diagram of a human body communication system according to an embodiment of the inventive concept.

FIG. 3 is a block diagram of a one-way human body communication system 100a according to an embodiment of the inventive concept.

Referring to FIG. 3, the human body communication system 100a may include a master device 110a and a slave device 120a.

The master device 110a may include a first transmission module TX_1 200a, a first reception module RX_1 300a, and a first control device 400a.

The first transmission module 200a may output a first signal S_1 based on a data signal D_S and a first transmission control signal CTR_T1. For example, the data signal D_S may be a signal that corresponds to an input signal Input Data. As an example, the input signal Input Data may be a signal that is received from a first external device (not shown).

For example, the first transmission module 200a may output the first signal S_1 having a pattern in which the waveform of a signal generated based on a data signal D_S and a first carrier wave and the waveform of a signal generated based on the data signal D_S and a second carrier wave are repeated according to a first transmission control signal CTR_T1. For example, the frequency of the first carrier wave may be higher than that of the second carrier wave.

Also, the first transmission module 200a may output the first signal S_1 generated based on a carrier wave having a frequency suitable for human body communication among the first carrier wave and the second carrier wave and the data signal D_S according to the first transmission control signal CTR_T1. The first transmission module 200a is described in more detail with reference to FIGS. 5 and 6.

The first reception module 300a may output a first reception control signal CTR_R1 in response to the attenuated signal of a second signal S_2. For example, the first reception control signal CTR_R1 may be a signal that corresponds to information on the carrier wave that is determined by a second control device 600a. Also, the first reception module 300a is described in more detail with reference to FIG. 11.

The first control device 400a may determine a carrier having a frequency suitable for human body communication among the first carrier wave and the second carrier wave based on the first reception control signal CTR_R1. Subsequently, the first control device 400a may output information on the determined carrier wave as the first transmission control signal CTR_T1.

The first control device 400a may output the data signal D_S based on the input signal Input Data. Also, the first control device 400a may regulate through the first transmission control signal CTR_T1 so that the first transmission module 200a outputs the first signal S_1. In this case, the first signal S_1 has a pattern in which the waveform of a signal generated based on a data signal D_S and a first carrier wave and the waveform of a signal generated based on the data signal D_S and a second carrier wave are repeated.

Also, the first control device 400a may regulate through the first transmission control signal CTR_T1 so that the first transmission module 200a outputs the first signal S_1. In this case, the first signal S_1 is generated based on a carrier wave having a frequency suitable for human body communication among the first carrier wave and the second carrier wave and the data signal D_S.

The slave device 120a may include a second reception module RX_2 500a, a second control device 600a, and a second transmission module TX_2 700a.

The second reception module 500a may output a second reception control signal CTR_R2 and a second reception data signal RX_D2 in response to the attenuated signal of the first signal S_1. For example, the second reception control signal CTR_R2 may include attenuation information on the first signal S_1. In addition, the second reception data signal RX_D2 may be a signal that corresponds to the data signal D_S. The second reception module 500a is described in more detail with reference to FIG. 11.

The second control device 600a may output an output signal Output Data based on the second reception data signal RX_D2. As an example, the output signal may be a signal that is output to a second external device (not shown).

The second control device 600a may determine a carrier having a frequency suitable for human body communication among the first carrier wave and the second carrier wave based on the second reception control signal CTR_R2. Subsequently, the second control device 600a may output information on the determined carrier wave as a second transmission control signal CTR_T2. Also, the second control device 600a may output information on a frequency and communication mode suitable for the operation of the inventive concept as carrier data D_C.

The second transmission module 700a may use the communication mode suitable for the carrier wave determined according to the second transmission control signal CTR_T2 to output the carrier data D_C as the second signal S_2. That is, the second transmission module 700a may output information on the carrier wave determined by the second control device 600a as the second signal S_2. The second transmission module 700a is described in more detail with reference to FIGS. 5 and 6.

Figure 4:
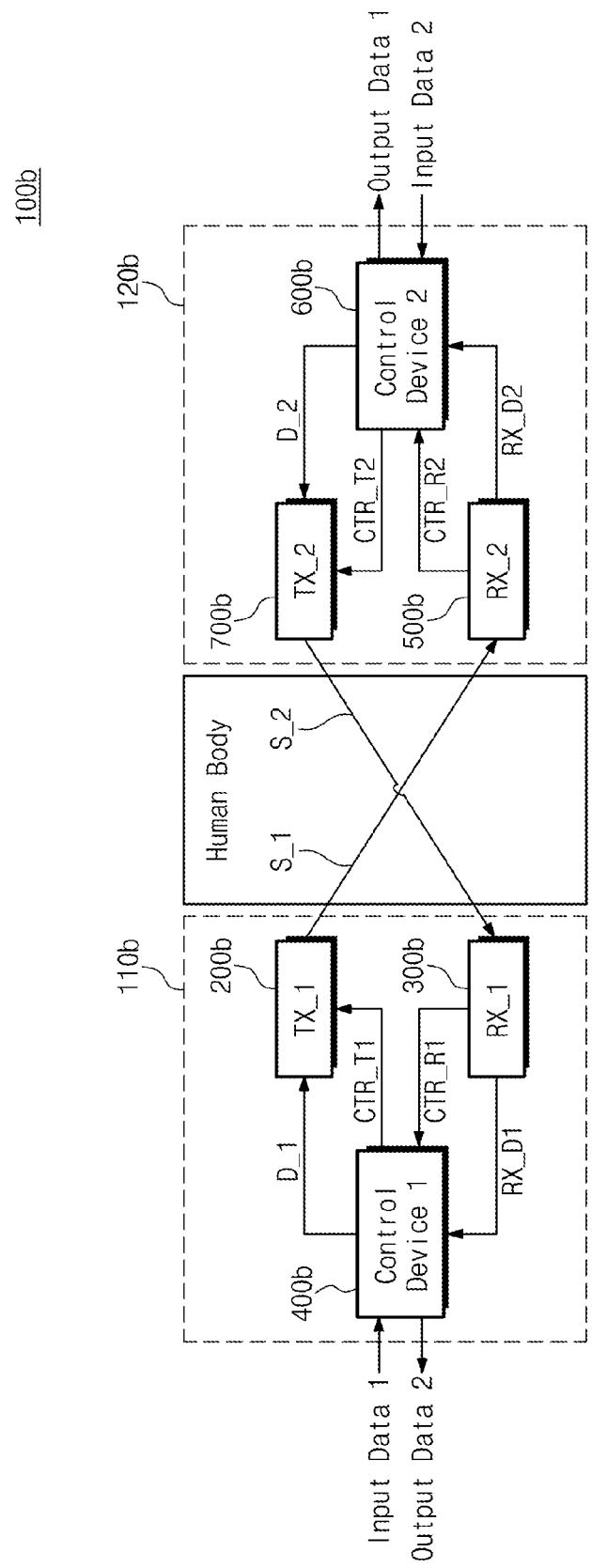
FIG. 4 is a block diagram of a human body communication system according to another embodiment of the inventive concept.

FIG. 4 is a block diagram of a human body communication system 100b according to another embodiment of the inventive concept.

Referring to FIG. 4, the human body communication system 100b may include a master device 110b and a slave device 120b.

The master device 110b may include a first transmission module TX_1 200b, a first reception module RX_1 300b, and a first control device 400b.

The first transmission module 200b may output a first signal S_1 based on a first data signal D_1 and a first transmission control signal CTR_T1. For example, the first data signal D_1 may be a signal that corresponds to a first input signal Input Data1.

For example, the first transmission module 200b may output the first signal S_1 according to the first transmission control signal CTR_T1. In this case, the first signal S_1 has a pattern in which the waveform of a signal generated based on the first data signal D_1 and a first carrier wave and the waveform of a signal generated based on the first data signal D_1 and a second carrier wave are repeated For example, the frequency of the first carrier wave may be higher than that of the second carrier wave.

Also, the first transmission module 200b may output the first signal S_1 according to the first transmission control signal CTR_T1. In this case, the first signal S_1 is generated based on a carrier wave having a frequency suitable for human body communication among the first carrier wave and the second carrier wave and the first data signal D_1. The first transmission module 200b is described in more detail with reference to FIGS. 5 and 6.

The first reception module 300b may output a first control signal CTR_R1 and a first reception data signal RX_D1 in response to the attenuated signal of a second signal S_2.

For example, the first reception control signal CTR_R1 may include attenuation information on the first signal S_1. In addition, the first reception control signal CTR_R1 may be a signal that corresponds to information on the carrier wave that is determined by a second control device 600b.

For example, the first reception data signal RX_D1 may be a signal that corresponds to a second data signal D_2. The first reception module 300b is described in more detail with reference to FIG. 11.

The first control device 400b may determine a carrier having a frequency suitable for human body communication among the first carrier wave and the second carrier wave based on the first reception control signal CTR_R1.

The first control device 400b may output the first data signal D_1 based on the first input signal Input Data1. As an example, the first input signal Input Data1 may be a signal that is received from a first external device (not shown).

Also, the first control device 400b may determine a carrier having a frequency suitable for human body communication among the first carrier wave and the second carrier wave based on the first reception control signal CTR_R1. Subsequently, the first control device 400b may output information on the determined carrier wave as the first transmission control signal CTR_T1.

That is, the first control device 400b may regulate through the first transmission control signal CTR_T1 so that the first transmission module 200b outputs the first signal S_1. In this case, the first signal S_1 has a pattern in which the waveform of a signal generated based on the first data signal D_1 and the first carrier wave and the waveform of a signal generated based on the first data signal D_1 and the second carrier wave are repeated. For example, the frequency of the first carrier wave may be higher than that of the second carrier wave.

Also, the first control device 400b may regulate through the first transmission control signal CTR_T1 so that the first transmission module 200b outputs the first signal S_1. In this case, the first signal S_1 is generated based on a carrier wave having a frequency suitable for human body communication among the first carrier wave and the second carrier wave and the first data signal D_1.

The slave device 120b may include a second reception module RX_2 500b, the second control device 600b, and a second transmission module TX_2 700b.

The second reception module 500b may output a second reception control signal CTR_R2 and a second reception data signal RX_D2 in response to the attenuated signal of the first signal S_1. For example, the second reception control signal CTR_R2 may include attenuation information on the first signal S_1. In addition, the second reception data signal RX_D2 may be a signal that corresponds to the first data signal D_1. The second reception module 500b is described in more detail with reference to FIG. 11.

The second control device 600b may output a first output signal Output Data1 based on the second reception data signal RX_D2. As an example, the first output signal Output Data1 may be a signal that is output to a second external device (not shown).

In addition, the second control device 600b may output the second data signal D_2 based on a second input signal Input Data2 that is received from an external device (not shown). The second data signal D_2 may include information on the carrier frequency and transmission mode that is included in the carrier data D_C in FIG. 3.

Also, the second control device 600b may determine a carrier having a frequency suitable for human body communication among the first carrier wave and the second carrier wave based on the second reception control signal CTR_R2. Subsequently, the second control device 600b may output information on the determined carrier wave as a second transmission control signal CTR_T2.

That is, the second control device 600b may regulate through the second transmission control signal CTR_T2 so that the second transmission module 700b outputs the second signal S_2. In this case, the second signal S_2 has a pattern in which the waveform of a signal generated based on the second data signal D_2 and the first carrier wave and the waveform of a signal generated based on the second data signal D_2 and the second carrier wave are repeated. For example, the frequency of the first carrier wave may be higher than that of the second carrier wave.

Also, the second control device 600b may regulate through the second transmission control signal CTR_T2 so that the second transmission module 700b outputs the second signal S_2. In this case, the second signal S_2 is generated based on a carrier wave having a frequency suitable for human body communication among the first carrier wave and the second carrier wave and the second data signal D_2.

The second transmission module 700b may output the second signal S_2 based on the second data signal D_2 and the second transmission control signal CTR_T2. For example, the second data signal D_2 may be a signal that corresponds to the second input signal Input Data2.

For example, the second transmission module 700b may output the second signal S_2 according to the second transmission control signal CTR_T2. In this case, the second signal S_2 has a pattern in which the waveform of a signal generated based on the second data signal D_2 and the first carrier wave and the waveform of a signal generated based on the second data signal D_2 and the second carrier wave are repeated.

Also, the second transmission module 700b may output the second signal S_2 according to the second transmission control signal CTR_T2. In this case, the second signal S_2 is generated based on the second data signal D_2 and a carrier wave having a frequency suitable for human body communication among the first carrier wave and the second carrier wave The second transmission module 700b is described in more detail with reference to FIGS. 5 and 6.

Figure 5:
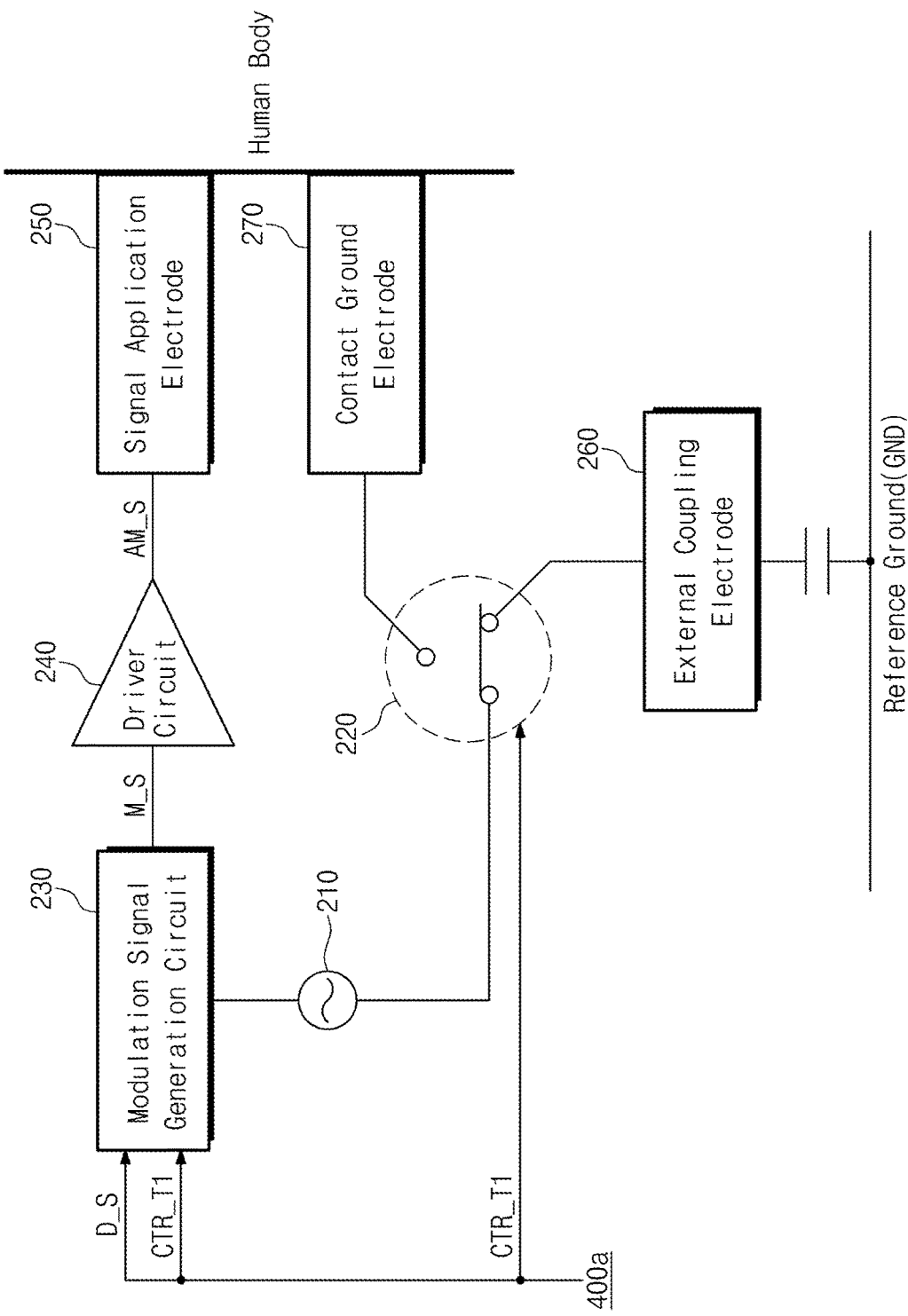
FIG. 5 shows a capacitive coupling transmission module according to an embodiment of the inventive concept.

FIG. 5 shows a capacitive coupling transmission module according to an embodiment of the inventive concept. It would be understood that the term "transmission module" refers to the first transmission module 200a and the second transmission module 700a in FIG. 3 and the first transmission module 200b and the second transmission module 700b in FIG. 4. However, for the brief description, FIG. 5 is described based on the first transmission module 200a in FIG. 3.

Referring to FIG. 5, the first transmission module 200a may include a local oscillator 210, a switching circuit 220, a modulation signal generation circuit 230, a driver circuit 240, a signal application electrode 250, an external coupling electrode 260, and a contact ground electrode 270.

The local oscillator 210 may generate a carrier wave having a high frequency and output the carrier wave to the modulation signal generation circuit 230. For example, the local oscillator 210 may output a carrier wave that has a frequency suitable for the capacitive coupling mode. In addition, the ground of the local oscillator 210 is connected to the reference ground GND of a terminal that forms the first transmission module 200a including a switching circuit 220. In general, it is configured to separate a high-frequency interference signal through a bead in order to avoid the interference of a digital circuit and an analog circuit that configures a terminal. In the inventive concept, the ground of a terminal connected to an external coupling electrode is not limited to a ground of a local oscillator in FIG. 5 and may be connected to another ground plane in a circuit that may increase capacitive coupling.

The switching circuit 220 may connect the ground of the local oscillator 210 to the external coupling electrode 260 or the contact ground electrode 270 according to the first transmission control signal CTR_T1. In FIG. 5, the switching circuit 220 connects the ground of the local oscillator 210 to the external coupling electrode 260 according to a first control signal CTR_1. For example, the switching circuit 220 may include a metal-oxide-silicon field-effect transistor (MOSFET), a semiconductor device.

The modulation signal generation circuit 230 may output a modulation signal M_S based on the first transmission control signal CTR_T1 and the output signal of the local oscillator 210. In addition, referring to FIGS. 3 and 5, the modulation signal generation circuit 230 may receive the data signal D_S.

The process of outputting, by the modulation signal generation circuit 230, the modulation signal M_S is described in more detail with reference to FIGS. 7 and 8.

The driver circuit 240 may amplify the output signal M_S of the modulation signal generation circuit 230 to adjust it to a power level suitable for communication that uses a human body as a medium. The output signal AM_S of the driver circuit 240 may be the same as the first signal S_1 that is the output of the first transmission module 200a.

The signal application electrode 250 is configured to be in contact with the human body. In addition, the signal application electrode 250 may apply a signal to a channel in the human body in order to deliver the output signal of the driver circuit 240 to the second reception module (not shown).

The external coupling electrode 260 is placed apart from the human body and may be exposed to the outside as shown in FIG. 5 for the coupling between the ground of the local oscillator 210 and the reference ground GND.

The contact ground electrode 270 is configured to be in contact with the human body. However, since the capacitive coupling transmission module does not use the contact ground electrode 270 as shown in FIG. 5, related descriptions are provided in conjunction with FIG. 6.

Referring to FIGS. 3 and 5, in the case where the external coupling electrode 260 is connected to the ground of the local oscillator 210, only the signal application electrode 250 of the first transmission module 200a is in contact with the human body. Therefore, the output signal of the first transmission module 200a is a signal that is generated by the capacitive coupling mode.

Figure 6:
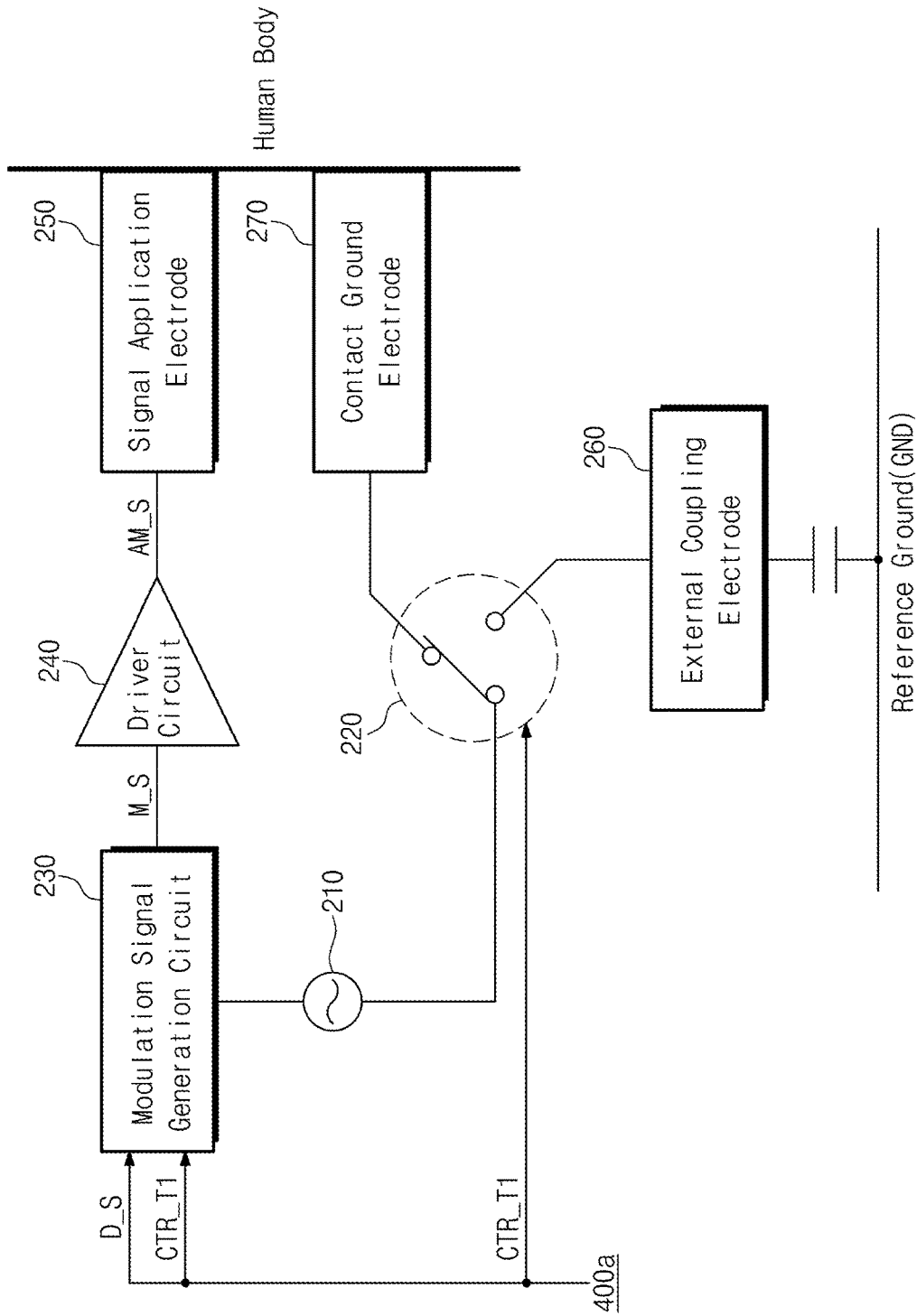
FIG. 6 shows a galvanic coupling transmission module according to an embodiment of the inventive concept.

FIG. 6 shows a galvanic coupling transmission module according to an embodiment of the inventive concept. In FIG. 6, it would be understood that the term "transmission module" refers to the first transmission module 200a and the second transmission module 700a in FIG. 3 and the first transmission module 200b and the second transmission module 700b in FIG. 4. However, for the brief description, FIG. 6 is described based on the first transmission module 200a in FIG. 3.

Referring to FIGS. 3 and 6, the first transmission module 200a may include a local oscillator 210, a switching circuit 220, a modulation signal generation circuit 230, a driver circuit 240, a signal application electrode 250, an external coupling electrode 260, and a contact ground electrode 270.

In FIG. 6, the switching circuit 220 connects the ground of the local oscillator 210 to the contact ground electrode 270 according to the first transmission control signal CTR_T1.

The contact ground electrode 270 is configured to be in contact with the human body. As shown in FIG. 6, in the case where the contact ground electrode 270 is connected to the ground of the local oscillator 210, two electrodes of the first transmission module 200a are in contact with the human body. Therefore, the output signal of the first transmission module 200a is a signal that is generated by the galvanic coupling mode.

For the brief description, the detailed descriptions of components in FIG. 6 that have the same reference as components in FIG. 5 are omitted.

Figure 7:
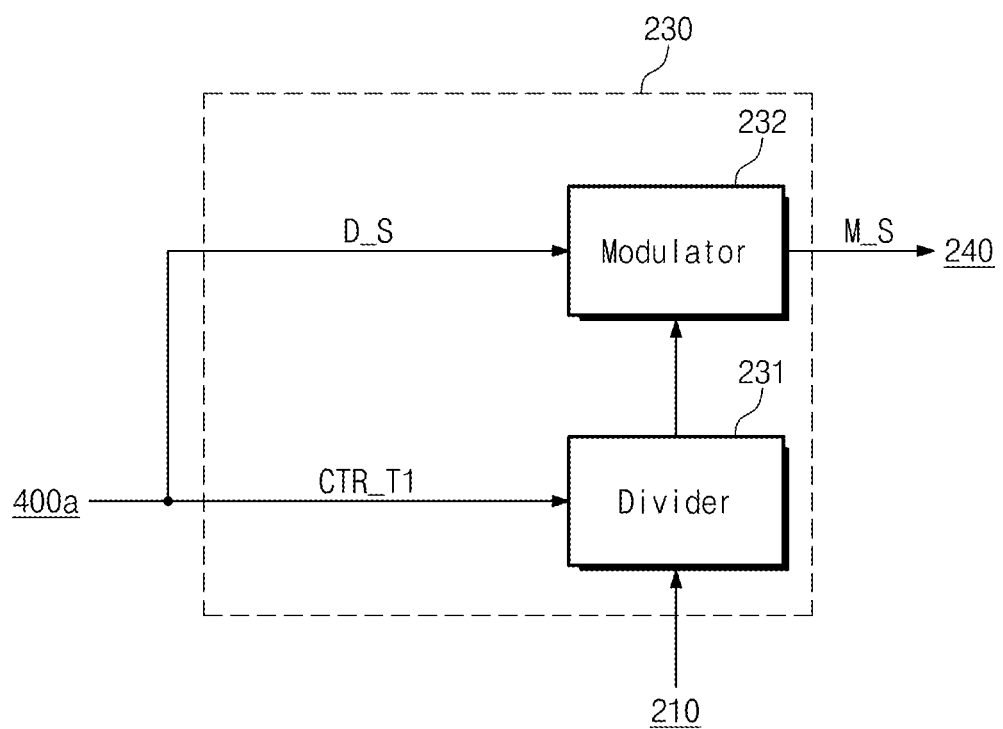
FIGS. 7 and 8 are diagrams of a modulation signal generation circuit according to an embodiment of the inventive concept.

FIG. 7 is a block diagram of the modulation signal generation circuit 230 according to an embodiment of the inventive concept.

Referring to FIG. 7, the modulation signal generation circuit 230 includes a divider 231 and a modulator 232.

The divider 231 receives, from the local oscillator 210, a carrier wave having a high frequency. For example, the divider 231 may receive a carrier wave that has a frequency suitable for the capacitive coupling mode. In addition, according to the first transmission control signal CTR_T1, the divider 231 may output a carrier wave, the output signal of the local oscillator 210 as it is or after lowering the frequency of the output signal of the local oscillator 210. For example, the local oscillator 232 may receive the output signal of the local oscillator 210 to output a carrier wave that has a frequency suitable for the galvanic coupling mode.

The modulator 232 may output the modulation signal M_S based on the received data signal D_S and the output signal of the divider 231. For example, in the case where the divider 231 outputs the output signal of the local oscillator 210 as it is, the modulator 232 may generate the modulation signal M_S that has a frequency suitable for the capacitive coupling mode. For example, in the case where the divider 231 outputs the signal after lowering the frequency of the output signal of the local oscillator 210, the modulator 232 may generate the modulation signal M_S that has a frequency suitable for the galvanic coupling mode. In general, the frequency suitable for the capacitive coupling mode refers to a frequency higher than the frequency suitable for the galvanic coupling mode. For example, the modulator 232 may be implemented by using a binary phase shift keying (BPSK) technique.

Figure 8:
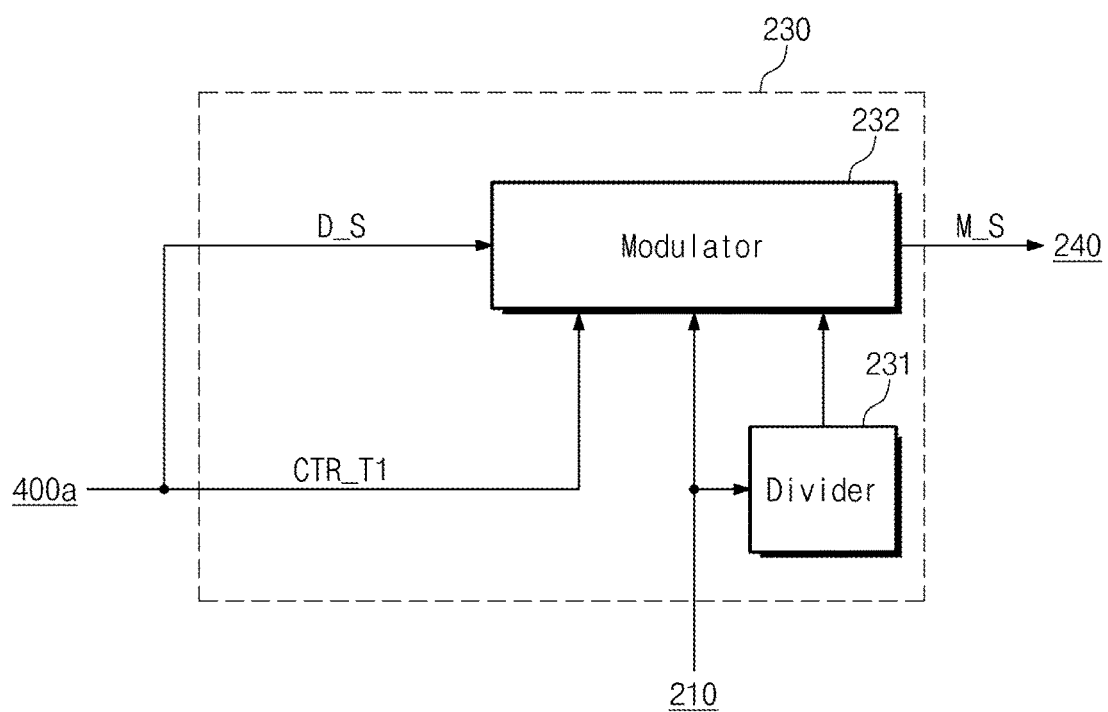

FIG. 8 is a block diagram of the modulation signal generation circuit 230 according to another embodiment of the inventive concept.

Referring to FIG. 8, the divider 231 may divide the output signal of the local oscillator 210 into signals that have frequencies suitable for the galvanic coupling mode, and output them to the modulator 232.

The divider 231 receives, from the local oscillator 210, a carrier wave having a high frequency. For example, the divider 231 may receive a carrier wave that has a frequency suitable for the capacitive coupling mode. In addition, the divider 231 may lower and output the frequency of the output signal of the local oscillator 210. For example, the divide 231 may receive the output signal of the local oscillator 210 to output a carrier wave that has a frequency suitable for the galvanic coupling mode.

The modulator 232 may output the modulation signal M_S based on any one of the output signals of the local oscillator 210 and the divider 231 and the received data signal D_S. In this case, any one of the output signals is selected according to the first transmission control signal CTR_T1.

For the brief description, the detailed descriptions of components in FIG. 8 that have the same reference as components in FIG. 7 are omitted.

FIG. 9 relates to the analog waveform of the output signal of a transmission module according to an embodiment of the inventive concept. In FIG. 9, it would be understood that the term "transmission module" refers to the first transmission module 200a in FIG. 3 and the first transmission module 200b and the second transmission module 700b in FIG. 4.

Referring to FIG. 9, the output signal of the transmission module has the output section P1 of a capacitive coupling signal and the output section P2 of a galvanic coupling signal. As mentioned in FIG. 1, the frequency of the signal of the output section P1 of the capacitive coupling signal may be a signal in MHz band. In addition, as mentioned in FIG. 2, the frequency of the signal of the output section P2 of the galvanic coupling signal may be a signal in kHz band.

$$\lambda = \frac{v}{f}. \qquad (1)$$

Referring to Equation (1), the wavelength λ of a signal is proportional to the propagation speed v of the signal and inversely proportional to a frequency f. In addition, the propagation speed v of the signal is constant in the same medium.

Referring to FIG. 9, the output section of the capacitive coupling signal is defined as a first section P1 and the output section of the galvanic coupling signal is defined as a second section P2. Also, the frequency of the signal of the first section P1 is defined as a first frequency f1 and the frequency of the signal of the second section P2 is defined as a second frequency f2. Also, the wavelength of the first section P1 is defined as a first wavelength λ1, and the wavelength of the second section P2 is defined as a second wavelength λ2.

It is assumed that an equal number of the waveforms of the first section P1 and the waveforms of the second section P2 are repeated. In this case, the frequency f1 of the signal of the first section P1 is higher than the frequency f2 of the signal of the second section P2. That is, since the frequency f1 of the first section P1 is higher than the frequency f2 of the second section P2, the first wavelength λ1 of the signal of the first section P1 is shorter than the second wavelength λ2 of the signal of the second section P2. Thus, as shown in FIG. 9, the second section P2 of the output signal of the transmission module lasts longer than the first section P1.

FIG. 10 relates to the digital waveform of the output signal of a transmission module according to an embodiment of the inventive concept. FIG. 10 corresponds to the case where a signal output from the transmission module is a digital signal. Referring to FIG. 10, the human body communication system 100 of the inventive concept may be applied to a digital communication mode as well as an analog communication mode.

Figure 11:
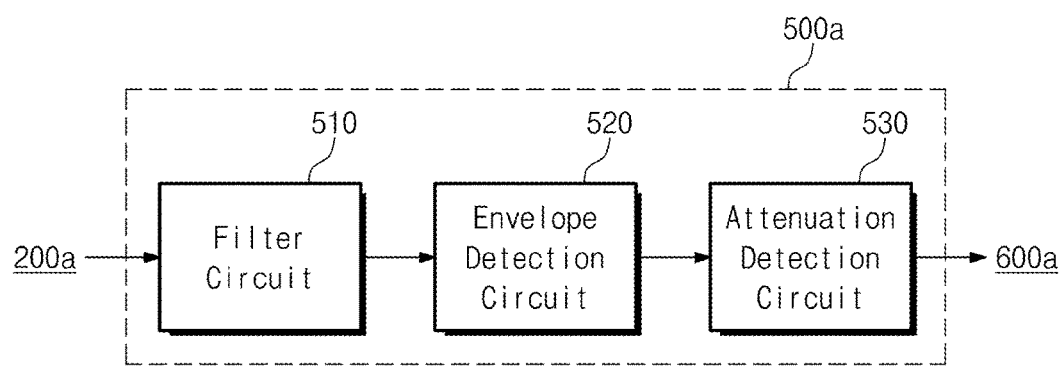
FIG. 11 is a block diagram of a reception module according to an embodiment of the inventive concept.

FIG. 11 is a block diagram of a reception module according to an embodiment of the inventive concept. It would be understood that the term "reception module" refers to the first reception module RX_1 300a and the second reception module RX_2 500a in FIG. 3 and the first reception module RX_1 300b and the second reception module RX_2 500b in FIG. 4. However, for the brief description, FIG. 11 is described based on the second reception module 500a in FIG. 3.

Referring to FIGS. 3 and 11, the second reception module 500a may include a filter circuit 510, an envelope detection circuit 520, and a duty cycle detection circuit 530.

Referring to FIGS. 3 and 11, when the first signal S_1 passes through a channel and is received by the second reception module 500a, the filter circuit 510 may remove an interference signal or noise signal included in the attenuated signal of the first signal S_1 when passing through the channel. Since the human body has a relatively long physical length, high permittivity, and conductivity, it may receive various signals that are propagated in the air, and in addition to the first signal S_1 attenuated while passing through the channel, various signals may be delivered to the human body by communication devices, electronic devices, and lighting devices that operate around. Thus, the filter circuit 510 may be used which selectively passes the first signal S_1 from various signals that are input through the second reception module 500a.

The envelope detection circuit 520 may detect the envelope signal of the output signal of the filter circuit 510. The detected envelope signal may be output to the duty cycle detection circuit 530.

The duty cycle detection circuit 530 may receive the detected envelope signal to detect attenuation information on the first signal S_1 that the second reception module 500a has received. That is, the duty cycle detection circuit 530 may determine a level of attenuation according to a frequency. Subsequently, the duty cycle detection circuit 530 may output, to the control device 600a, the second reception control signal CTR_R2 that includes the detected attenuation information.

The operating process of the duty cycle detection circuit 530 is described in more detail with reference to FIGS. 12 and 13.

Figure 12:
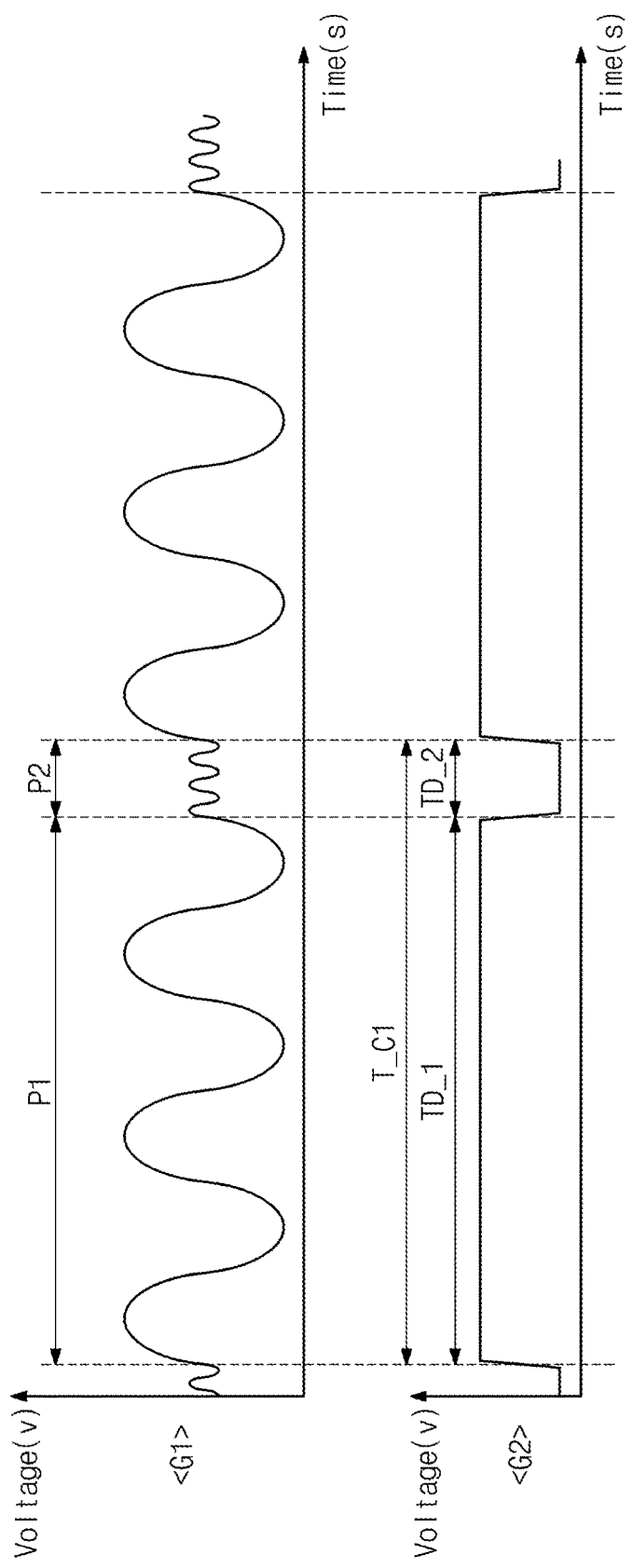
FIGS. 12 and 13 relate to the waveform of the received signal of a reception module according to an embodiment of the inventive concept.

A first graph G1 in FIG. 12 relates to the waveform of the input signal of the envelope detection circuit 520 in FIG. 11 according to an embodiment of the inventive concept, and a second graph G2 in FIG. 12 relates to the output signal of the envelope detection circuit 520 in FIG. 11 according to an embodiment of the inventive concept. The horizontal axis in FIG. 12 refers to time s and the vertical axis refers to voltage v.

Referring to FIGS. 3, 9, and 12, it is assumed that the signal in FIG. 9 is the first signal S_1, the output signal of the first transmission module 200a, the signal in the first graph G1 in FIG. 12 is the attenuated signal of the first signal S_1 when passing through the channel, the signal in the second graph G2 in FIG. 12 is the envelope signal of the attenuated signal of the first signal S_1, and the number of the repeated waveforms of the signal in FIGS. 9 and 12 is three.

For example, the first signal S_1 output from the first transmission module 200a varies in level of attenuation of signal according to the frequencies of the first section P1 and the second section P2 when passing through the channel.

Referring to FIGS. 9 and 11, and the first graph G1 in FIG. 12, the amplitudes of the voltages of the first section P1 and the second section P2 of the output signal of the first transmission module 200a in FIG. 9 may be the same. However, the level of the voltage of the first section P1 of the first graph G1 in FIG. 12 is higher than that of the second section P2. That is, the level of attenuation of the signal having the first frequency f1 of the first section P1 is lower than that of the signal having the second frequency f2 of the second section P2.

Referring to the second graph G2 in FIG. 12, a first envelope signal TD_1 of the first section P1 has a high level and a second envelope signal TD_2 of the second section P2 has a low level. In addition, the sum of the sustain time of the first envelope signal TD_1 and the sustain time of the second envelope signal TD_2 corresponds to a first cycle T_C1.

Referring to FIGS. 3 to 5, 9, 11 and 12, the duty cycle detection circuit 530 may determine a level of attenuation according to a frequency based on information on the duty ratio of a section in which the first envelope signal TD_1 of the first section P1 has a high level and a section in which the second envelope signal TD_2 of the second section P2 has a low level. For example, the duty cycle detection circuit 530 may be implemented in various forms, such as a timer, clock counter, or PWM decoder.

The control device 600a may determine a frequency and communication mode suitable for the operation of the human body communication system 100a of the inventive concept based on attenuation information. For example, it is possible to determine that the frequency f1 of the first section P1 is a frequency suitable for the operation of the human body communication system 100a of the inventive concept and as an example, it is possible to determine that a communication mode according to capacitive coupling is a suitable communication mode. Also, the control device 600a may output information on the frequency and communication mode suitable for the operation of the inventive concept as the first transmission control signal CTR_T1.

As shown in the second graph G2 in FIG. 12, in the case where the difference in level of attenuation between the signal of the first section P1 and the signal of the second section P2 is big, the duty cycle detection circuit 530 may divide into a high level and a low level like a digital signal, and detect attenuation information according to a frequency based on information on the duty ratio.

However, when the difference in level of attenuation between the signal of the first section P1 and the signal of the second section P2 is not big, a comparator (not shown) may be connected to the output of the envelope detection circuit 520 so that the amplitudes of the first envelope signal TD_1 and the second envelope signal TD_2 are generated as discrete signals. In addition, the duty cycle detection circuit 530 may detect attenuation information according to a frequency based on discrete signals that are output from the comparator (not shown).

Figure 13:
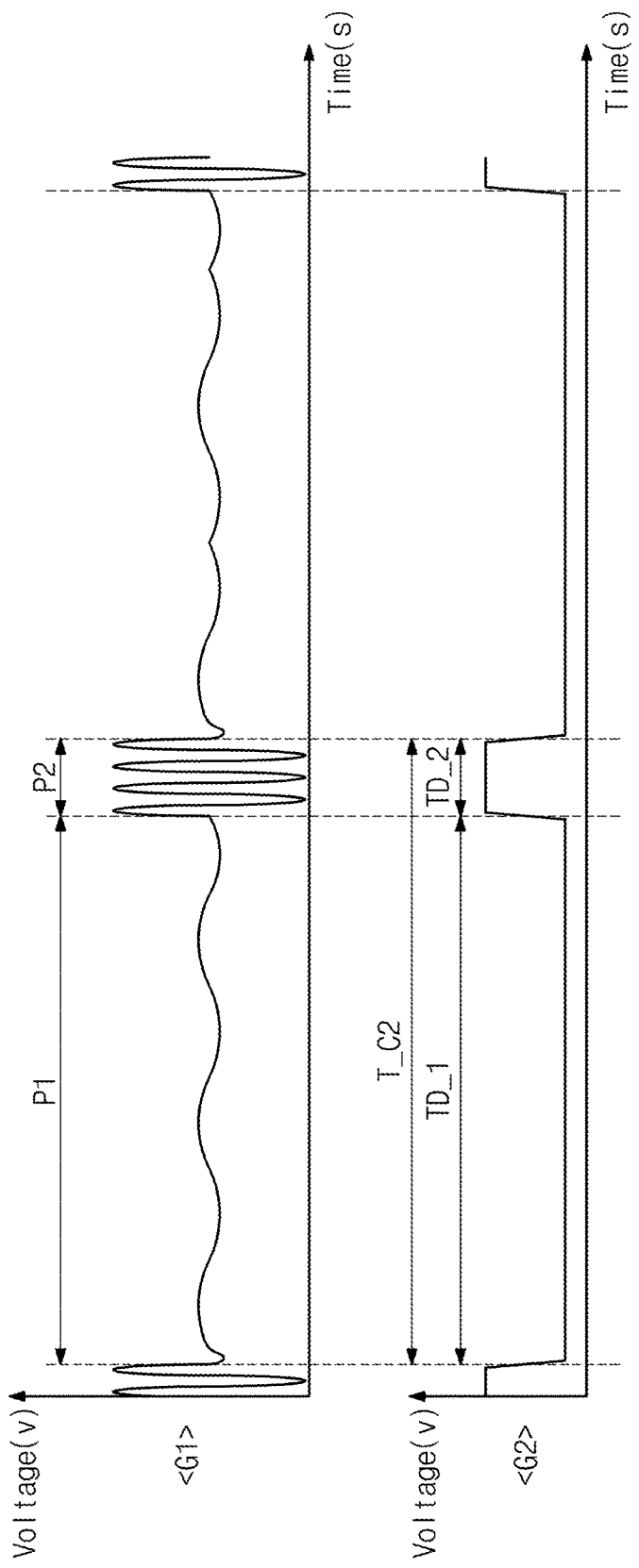

A first graph G1 in FIG. 13 relates to the waveform of the input signal of the envelope detection circuit 520 in FIG. 11 according to an embodiment of the inventive concept, and a second graph G2 in FIG. 13 relates to the output signal of the envelope detection circuit 520 in FIG. 11 according to an embodiment of the inventive concept. The horizontal axis in FIG. 13 refers to time s and the vertical axis refers to voltage v.

Referring to FIGS. 3, 9, 11, and 13, it is assumed that the signal in FIG. 9 is the first signal S_1, the output signal of the first transmission module 200a, the signal in the first graph G1 in FIG. 13 is the attenuated signal of the first signal S_1 when passing through the channel, the signal in the second graph G2 in FIG. 13 is the envelope signal of the attenuated signal of the first signal S_1, and the number of the repeated waveforms of the signals in FIGS. 9 and 13 is three.

For example, the first signal S_1 output from the first transmission module 200a varies in level of attenuation of signal according to the frequencies of the first section P1 and the second section P2 when passing through the channel.

Referring to FIGS. 9 and 11, and the first graph G1 in FIG. 13, the amplitudes of the voltages of the first section P1 and the second section P2 of the output signal of the first transmission module 200a in FIG. 9 may be the same.

However, the level of the voltage of the first section P1 of the first graph G1 in FIG. 13 is lower than that of the second section P2. That is, the level of attenuation of the signal having the first frequency f1 of the first section P1 is higher than that of the signal having the second frequency f2 of the second section P2.

Referring to the second graph G2 in FIG. 13, the first envelope signal TD_1 of the first section P1 has a low level and the second envelope signal TD_2 of the second section P2 has a high level. In addition, the sum of the sustain time of the first envelope signal TD_1 and the sustain time of the second envelope signal TD_2 corresponds to a second cycle T_C2.

Referring to FIGS. 3 to 5, 9, 11 and 13, the duty cycle detection circuit 530 may calculate information on the duty ratio of a section in which the first envelope signal TD_1 of the first section P1 has a low level and a section in which the second envelope signal TD_2 of the second section P2 has a high level. For example, the control device 600a may determine a level of attenuation according to a frequency based on information on the duty ratio.

The control device 600a may determine a frequency and communication mode suitable for the operation of the human body communication system 100a of the inventive concept based on attenuation information. For example, it is possible to determine that the frequency f2 of the second section P2 is a frequency suitable for the operation of the human body communication system 100a of the inventive concept and as an example, it is possible to determine that a communication mode according to capacitive coupling is a suitable communication mode. Also, the control device 600a may output information on the frequency and communication mode suitable for the operation of the inventive concept as the second transmission control signal CTR_T2.

As shown in the second graph G2 in FIG. 13, in the case where the difference in level of attenuation between the signal of the first section P1 and the signal of the second section P2 is big, the envelope detection circuit 320 may determine a high level and a low level like a digital signal, and detect the duty ratio.

Figure 14:
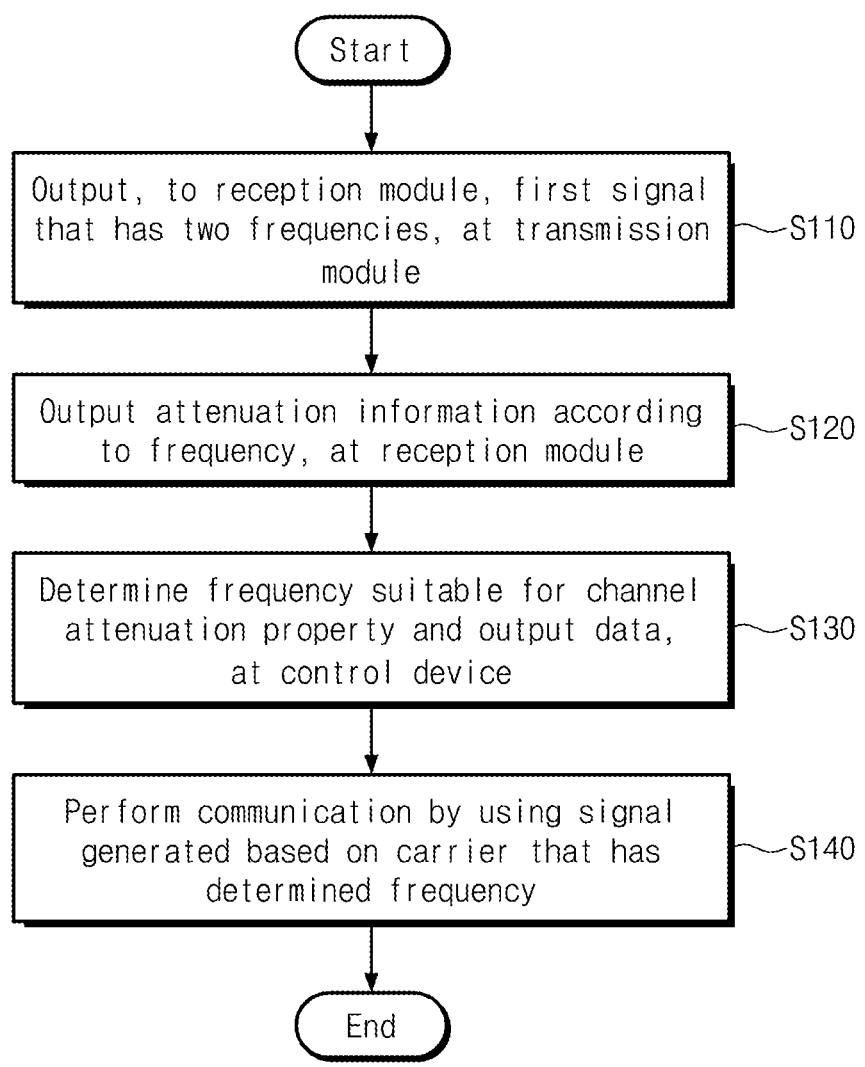
FIG. 14 is a flowchart of the communication method of a human body communication system according to an embodiment of the inventive concept.

FIG. 14 is a flowchart of the communication method of a one-way human body communication system 100a according to an embodiment of the inventive concept.

Referring to FIGS. 3, 9, 11 and 14, in step S110, the first transmission module 200a may receive the data signal D_S, and output, to the second reception module 500a, the first signal S_1 that has the first frequency f1 in the first section P1 and the second frequency f2 in the second section P2 and has the same level of voltage as shown in FIG. 9.

In step S120, the second reception module 500a may detect the envelope signal of the attenuated signal of the first signal S_1 when passing through a channel. Subsequently, the second reception module 500a may calculate information on the duty ratio based on the detected envelope signal. Subsequently, the second reception module 500a may output, to the second control device 600a, attenuation information according to a frequency as the second reception control signal CTR_R2 based on information on the duty ratio. Also, the second reception module 500a may output the second reception data signal RX_D2 based on the attenuated signal of the first signal S_1. For example, the second reception data signal RX_D2 may be a signal that corresponds to the data signal D_S.

In step S130, the control device 600a may determine a frequency and communication mode suitable for the operation of the human body communication system 100a of the inventive concept based on the second reception control signal CTR_R2. In addition, the control device 600a may output information on the frequency and communication mode suitable for the operation of the inventive concept as the second transmission control signal CTR_T2. In addition, the control device 600a may output information on a frequency and communication mode suitable for the operation of the inventive concept as carrier data D_C. Also, the control device 600a may output an output signal Output Data to an external device (not shown) based on the second reception data signal RX_D2.

In step S140, the second transmission module 700a may use the communication mode suitable for the carrier wave determined according to the second transmission control signal CTR_T2. And the second transmission module 700a may output, to the first reception module 300a, the carrier data D_C as the second signal S_2. For example, the carrier data D_C may include information on the frequency and communication mode suitable for the operation of the inventive concept. As a result, the information on the frequency and communication mode suitable for the operation of the inventive concept determined in the slave device 120a may be delivered to the master device 110a through step S140. Subsequently, the master device 110a and the slave device 120a perform communication by using the frequency and communication mode suitable for the operation of the inventive concept.

As an example, the communication method of the human body communication system 100a as shown in FIG. 14 may be suitable for a passive channel that has a slight variation in communication channel.

Figure 15:
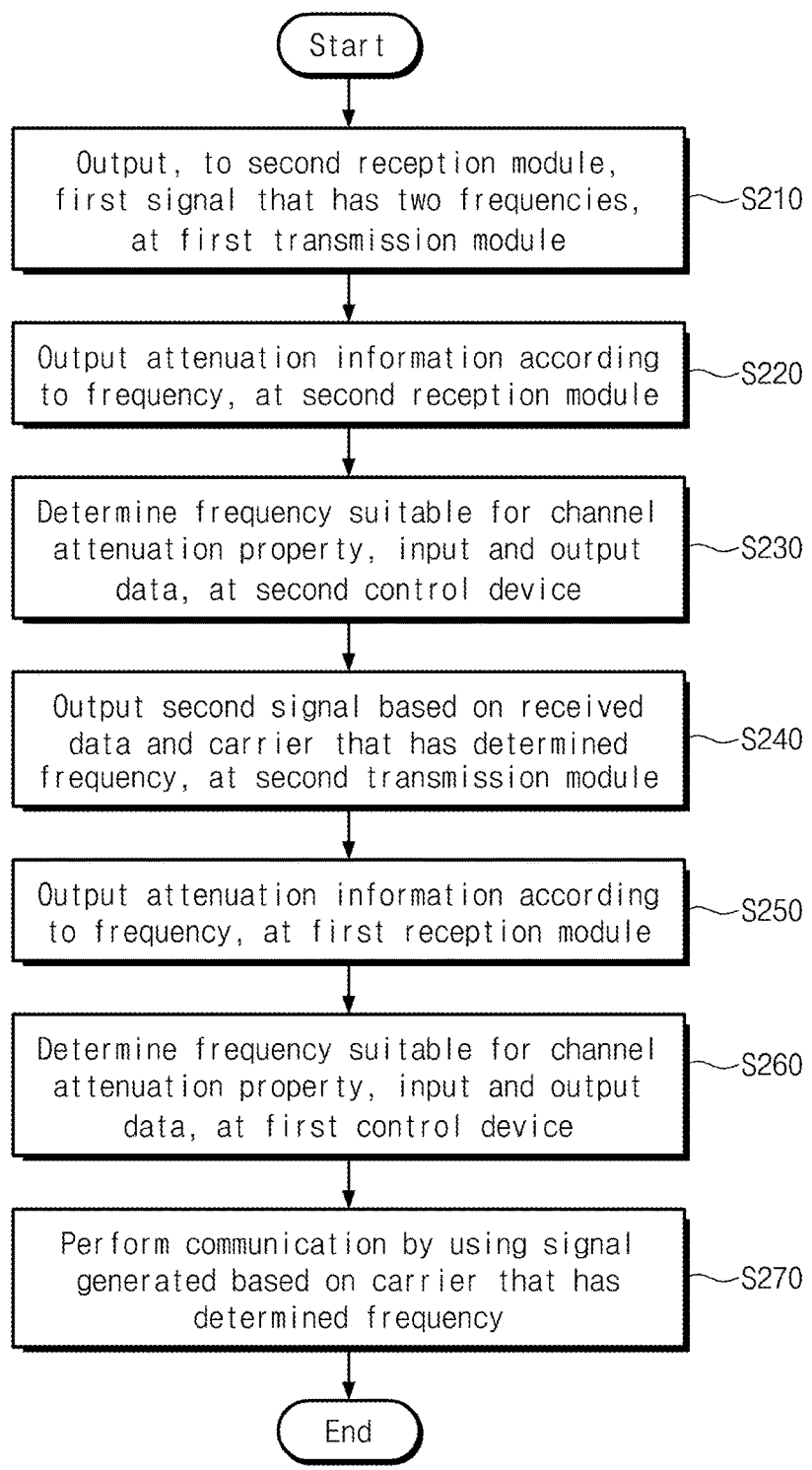
FIG. 15 is a flowchart of the communication method of a human body communication system according to another embodiment of the inventive concept.

FIG. 15 is a flowchart of the communication method of a first operating mode of a two-way human body communication system 100b according to an embodiment of the inventive concept.

Referring to FIGS. 4, 9, 11 and 15, in step S210, the first transmission module 200b may receive the first data signal D_1, and output, to the second reception module 500b, the first signal S_1 that has the first frequency f1 in the first section P1 and the second frequency f2 in the second section P2 and has the same level of voltage as shown in FIG. 9.

In step S220, the second reception module 500b may detect the envelope signal of the attenuated signal of the first signal S_1 when passing through a channel. Subsequently, the second reception module 500b may calculate information on the duty ratio based on the detected envelope signal. Subsequently, the second reception module 500b may output, to the second control device 600b, attenuation information according to a frequency as the second reception control signal CTR_R2 based on information on the duty ratio. Also, the second reception module 500b may output the second reception data signal RX_D2 based on the attenuated signal of the first signal S_1. For example, the second reception data signal RX_D2 may be a signal that corresponds to the first data signal D_1.

In step S230, the second control device 600b may determine a frequency and communication mode suitable for the operation of the human body communication system 100b of the inventive concept based on the second reception control signal CTR_R2. In addition, the control device 600b may output information on the frequency and communication mode suitable for the operation of the inventive concept as the second transmission control signal CTR_T2. Also, the control device 600b may output, to a second external device (not shown), a first output signal Output Data1 based on the second reception data signal RX_D2. In addition, the control device 600b may output, to the second transmission module 700b, a second data signal D_2 generated based on a second input signal Input Data2 that is received from the second external device (not shown). The second data signal D_2 may include information on a frequency and transmission mode suitable for the human body communication that is obtained from the first signal S_1.

In step S240, the first transmission module 200b may receive the second data signal D_2, and use the communication mode suitable for a carrier wave determined according to the second transmission control signal CTR_T2 to output the second signal S_2 to the first reception module 300b.

In step S250, the first reception module 300b may detect the envelope signal of the attenuated signal of the second signal S_2 when passing through a channel. Subsequently, the first reception module 300b may calculate information on the duty ratio based on the detected envelope signal. Subsequently, the first reception module 300b may output, to the first control device 400b, attenuation information according to a frequency as the first reception control signal CTR_R1 based on information on the duty ratio. Also, the first reception module 300b may output the first reception data signal RX_D1 based on the attenuated signal of the second signal S_2. For example, the first reception data signal RX_D1 may be a signal that corresponds to a second data signal D_2.

In step S260, the control device 400b may determine a frequency and communication mode suitable for the operation of the human body communication system 100b of the inventive concept based on the first reception control signal CTR_R1. In addition, the control device 400b may output information on the frequency and communication mode suitable for the operation of the inventive concept as the first transmission control signal CTR_T1. Also, the control device 400b may output, to a first external device (not shown), a second output signal Output Data2 based on the first reception data signal RX_D1. In addition, the control device 400b may output, to the first transmission module 200b, the first data signal D_1 based on the first input signal Input Data1 that is received from the first external device (not shown).

In step S270, the first transmission module 200b may use the communication mode suitable for the carrier wave determined according to the first transmission control signal CTR_T1 to output the first data signal D_1 to the second reception module 500b. As a result, the two-way human body communication system 110b according to the inventive concept may perform communication by using the frequency and communication mode suitable for the operation of the inventive concept that are determined in the master device 110b and the slave device 120b.

As an example, the communication method of the two-way human body communication system 100b as shown in FIG. 15 may be suitable in the case of a passive channel that has a slight variation in communication channel.

Figure 16:
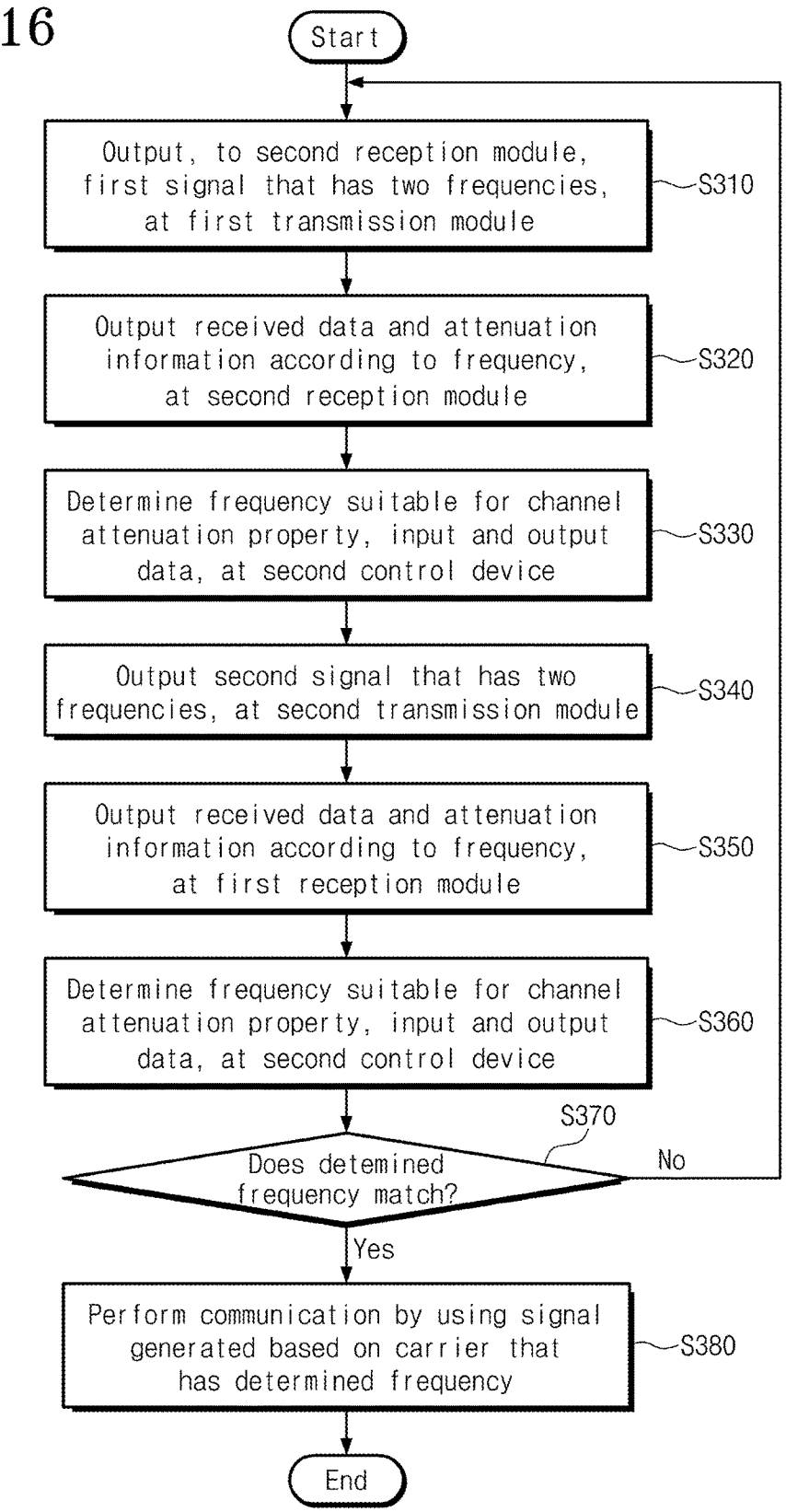
FIG. 16 is a flowchart of the communication method of a second operating mode of the two-way human body communication system 100*b* according to an embodiment of the inventive concept.

FIG. 16 is a flowchart of the communication method of a second operating mode of the two-way human body communication system 100b according to an embodiment of the inventive concept.

Referring to FIGS. 4, 9, 11 and 16, in step S310, the first transmission module 200b may output, to the second reception module 500b, the first signal S_1 that has the first frequency f1 in the first section P1 and the second frequency f2 in the second section P2 and has the same level of voltage as shown in FIG. 9.

In step S320, the second reception module 500b may detect the envelope signal of the attenuated signal of the first signal S_1 when passing through a channel. Subsequently, the second reception module 500b may calculate information on the duty ratio based on the detected envelope signal. Subsequently, the second reception module 500b may output, to the second control device 600b, attenuation information according to a frequency as a second reception control signal CTR_R2 based on information on the duty ratio. Also, the second reception module 500b may output a second reception data signal RX_D2 based on the attenuated signal of the first signal S_1. For example, the second reception data signal RX_D2 may be a signal that corresponds to a first data signal D_1.

In step S330, the second control device 600b may determine a frequency and communication mode suitable for the operation of the human body communication system 100b of the inventive concept based on the second reception control signal CTR_R2. In addition, the control device 600b may output a second transmission control signal CTR_T2 so that the second transmission module 700b outputs a pattern in which the waveform of the signal generated based on a first carrier wave and the waveform of the signal generated based on a second carrier wave are repeated. In addition, the control device 600b may include information on the frequency and communication mode determined by the second control device 600b in a second data signal D_2 generated based on a second input signal Input Data2 and output the signal to the second transmission module 700b.

Also, the control device 600b may output, to a second external device (not shown), a first output signal Output Data1 based on the second reception data signal RX_D2.

In step S340, the second transmission module 700b may output a second signal S_2 to the first reception module 300b to output a pattern in which the waveform of the signal generated based on the first carrier wave and the waveform of the signal generated based on the second carrier wave are repeated according to the second transmission control signal CTR_T2. In this case, the second signal S_2 may include information on the frequency and communication mode of the carrier wave determined by the second control device 600b as well as a second data signal D_2.

In step S350, the first reception module 300b may detect the envelope signal of the attenuated signal of the second signal S_2 when passing through a channel. Subsequently, the first reception module 300b may calculate information on the duty ratio based on the detected envelope signal. Subsequently, the first reception module 300b may output, to the first control device 400b, attenuation information according to a frequency as a first reception control signal CTR_R1 based on information on the duty ratio. In this case, the first reception control signal CTR_R1 may include information on the frequency and communication mode of the carrier wave determined by the second control device 600b, as well as attenuation information detected by the first reception module 300b.

Also, the first reception module 300b may output the first reception data signal RX_D1 based on the attenuated signal of the second signal S_2. For example, the first reception data signal RX_D1 may be a signal that corresponds to the second data signal D_2.

In step S360, the first control device 400b may determine a frequency and communication mode suitable for the operation of the human body communication system 100b of the inventive concept based on the first reception control signal CTR_R1.

In step S370, the first control device 400b may determine whether information on the frequency and communication mode determined according to the first reception control signal CTR_R1 matches information on the frequency and communication mode determined by the second control device 600b that is include in the first reception control signal CTR_R1.

In the case where they do not match, the human body communication system 110b may re-perform step S310.

In the case where the determined carrier waves match, the human body communication system 110b performs step S380. That is, when master to slave communication is referred to as downlink and slave to master communication is referred to as uplink, it is possible to perform setting so that carrier bands used for the downlink and uplink match and it is also possible to find the carrier wave and transmission mode suitable for the downlink and uplink through steps S310 to S360 and directly apply step S380, as shown in FIG. 16.

In step S380, the master device 110b and the slave device 120b of the human body communication system 100b may use a communication mode suitable for the determined carrier wave to output the first signal S_1 and the second signal S_2.

For example, the communication method of the human body communication system 100b as shown in FIG. 15 may be suitable in the case of an active channel that has a significant variation in communication channel.

Figure 17:
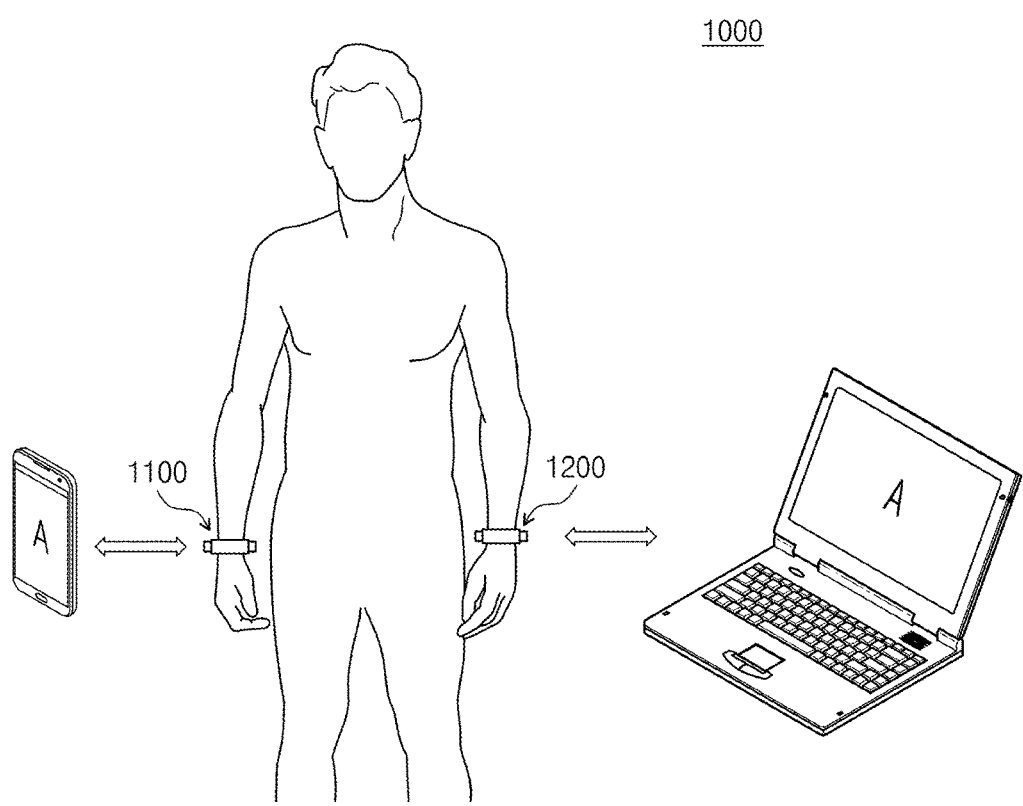
FIG. 17 shows one of applications of the inventive concept.

FIG. 17 shows one of applications of the inventive concept.

FIG. 17 is a schematic view 1000 of the human body communication system that is attached to a human body.

As an example, it is assumed that a first external device is a mobile phone and a second external device is a notebook computer. In this case, information relating to the screen of the mobile phone that is the first external device is transmitted to a master device 1100, as shown in FIG. 17. In addition, the master device 1100 and a slave device 1200 are attached to the human body and perform communication by using the human body as a medium. In addition, the slave device 1200 may transmit the received information to the notebook computer that is the second external device.

Embodiments of the inventive concept provide a human body communication system that determines the characteristic of a communication channel from signals received by a communication device attached to the human body, transmits and receives information by using a carrier wave having a frequency having little signal distortion or attenuation upon passing a channel based on the determined characteristic to provide enhanced reliability and accuracy.

Although the detailed description of the inventive concept has provided particular embodiments, there may be many variations without departing from the scope of the inventive concept. Therefore, the scope of the inventive concept should not be limited to the above-described embodiments but should be defined by equivalents of the following claims as well as the following claims.

What is claimed is:

1. A human body communication system comprising:
  a master device configured to output a first signal comprising a repeating sequence of a first carrier wave carrying first data and a second carrier wave carrying the first data; and
  a slave device configured to receive the first signal, to determine a carrier wave having a lowest level of attenuation among the first carrier wave and the second carrier wave, and to output a second signal in which a second data signal is encoded on the carrier wave with the lowest level of attenuation.

2. The human body communication system of claim 1, wherein a frequency of the first carrier wave is higher than a frequency of the second carrier wave.

3. The human body communication system of claim 1, wherein the master device comprises:
  a first transmission module configured to output the first signal based on the first data signal and a signal having a pattern in which the waveform of the first carrier wave and the waveform of the second carrier wave are repeated, according to a first transmission control signal;
  a first reception module configured to receive the second signal and to output a first reception control signal and a first reception data signal; and
  a first control device configured to determine a carrier wave having a low attenuation level based on the first reception control signal.

4. The human body communication system of claim 3, wherein the first control device is configured to adjust the first transmission control signal to output the first signal based on the determined carrier wave.

5. The human body communication system of claim 3, wherein the first control device is configured to
  output the first data signal based on a first input signal, and
  output a first output signal based on the first reception data signal.

6. The human body communication system of claim 3, wherein the first transmission module comprises:
  a local oscillator configured to output a carrier wave that has a high frequency;
  a switching circuit configured to select output electrodes to which ground of the first transmission module is connected, according to the first transmission control signal;
  a modulation signal generation circuit configured to output a modulation signal according to the first transmission control signal and the first data signal;
  a driver circuit configured to amplify and output the modulation signal to have a power level suitable for communication; and
  a signal application electrode configured to be attached to a human body and deliver the amplified modulation signal to inside of the human body,
  wherein the output electrodes comprise a contact ground electrode that is configured to be attached to the human body, and an external coupling electrode that is configured to be connected to reference ground.

7. The human body communication system of claim 6, wherein the modulation signal generation circuit comprises:
  a divider configured to output the carrier wave without a change or to output the carrier wave after a decrease in frequency of the carrier wave according to the first transmission control signal; and
  a modulator configured to output the modulation signal based on an output signal from the divider and the first data signal.

8. The human body communication system of claim 3, wherein the first reception module comprises:
  a filter circuit configured to remove a noise signal from the received second signal;
  an envelope detection circuit configured to detect an envelope signal from the received second signal; and
  an attenuation detection circuit configured to detect attenuation information in relation to a frequency according to the envelope signal from the received second signal, and output the detected attenuation information as the first reception control signal.

9. The human body communication system of claim 1, wherein the slave device comprises:
- a second transmission module configured to output the second signal according to a second transmission control signal;
- a second reception module configured to receive the first signal to output a second reception control signal and a second reception data signal; and
- a second control device configured to determine a carrier wave having a lower attenuation level among the first carrier wave and the second carrier wave based on the second reception control signal.

10. The human body communication system of claim 9, wherein the second control device is configured to
output the second data signal based on a second input signal, and
output a second output signal based on the second reception data signal.

11. The human body communication system of claim 9, wherein the second control device is configured to
adjust the second transmission control signal to output the second signal based on a signal having a pattern in which the waveform of the first carrier wave and the waveform of the second carrier wave are repeated, and
comprise and output attenuation information determined through the second reception control signal in the second data signal.

12. The human body communication system of claim 11, wherein the second transmission module outputs the second signal based on the second data signal and the second transmission control signal.

13. The human body communication system of claim 12, wherein the first reception module outputs a first reception data signal and a first reception control signal based on the second signal, wherein the first reception control signal comprises attenuation information determined through the second control device and attenuation information in relation to a frequency of the second signal detected by the first reception module.

14. The human body communication system of claim 13, wherein the second control device is configured to
receive the first reception control signal to compare the attenuation information determined by the second control device with the attenuation information in relation to the frequency of the second signal detected by the first reception module, and
adjust the first transmission control signal to output the first signal based on a carrier wave having a low attenuation level in a case where as a result of the comparison, there is a match.

15. The human body communication system of claim 14, wherein the second control device adjusts the second transmission control signal to output the second signal based on a carrier wave having the low attenuation level in a case where the first signal is generated based on the carrier wave having the low attenuation level.

16. The human body communication system of claim 14, wherein the second control device adjusts the first transmission control signal to allow the first signal to have a pattern in which a waveform of a signal generated based on the first carrier wave and a waveform of a signal generated based on the second carrier wave are repeated in a case where as a result of the comparison, there is a mismatch.

17. A human body communication system comprising:
- a slave device configured to output an output signal corresponding to a first signal to an external device, to receive the first signal to determine a carrier wave having a low attenuation level, and to output a second signal based on the determined carrier wave and carrier wave data corresponding to the determined carrier wave; and
- a master device configured to receive an input signal and the second signal to output the first signal,
wherein the first signal has a pattern in which a first carrier wave having a first frequency and a second carrier wave having a second frequency are repeated.

18. The human body communication system of claim 17, wherein the first frequency is from 20kHz to 60 kHz, and the second frequency is from 60 Mhz to 70 Mhz.

19. The human body communication system of claim 17, wherein the first carrier wave is a galvanic coupling signal, and the second carrier wave is a capacitive coupling signal.

* * * * *